United States Patent [19]
Kerr

[11] 3,771,614
[45] Nov. 13, 1973

[54] WEIGHT SCALE FOR VEHICLE

[76] Inventor: Arnold Kerr, 1010 Third St., International Falls, Minn. 56649

[22] Filed: Oct. 4, 1972

[21] Appl. No.: 294,941

[52] U.S. Cl. ............................ 177/137, 177/233
[51] Int. Cl. ...................... G01g 19/08, G01g 3/02
[58] Field of Search ............ 177/136–138, 232, 233

[56] References Cited
UNITED STATES PATENTS
1,689,644  10/1928  Troll .................................. 177/138
2,687,293  8/1954  Jackson ............................. 177/137
FOREIGN PATENTS OR APPLICATIONS
1,190,623  5/1970  Great Britain ..................... 177/137

Primary Examiner—George H. Miller, Jr.
Attorney—Jack W. Wicks et al.

[57] ABSTRACT

A weight scale for mounting on a vehicle including a reference back member, a pointer member having a pointer extension, a tube mounted on said back member in which the pointer is slidably mounted, a cable connected to said pointer member and extending throughout said tube and from said back member for connection with the chassis of a vehicle and a coil spring upon said cable and against said pointer member and a shoulder on said back member thereby urging said pointer member in an extended position relative to the back member.

7 Claims, 4 Drawing Figures

PATENTED NOV 13 1973        3,771,614

WEIGHT SCALE FOR VEHICLE

SUMMARY

The invention relates to an improvement in a device for attachment to a vehicle for directing and continuously indicating the weight load, axle limit of the vehicle, road limit and empty weight.

In the drawings forming part of this application:

Figure 1:
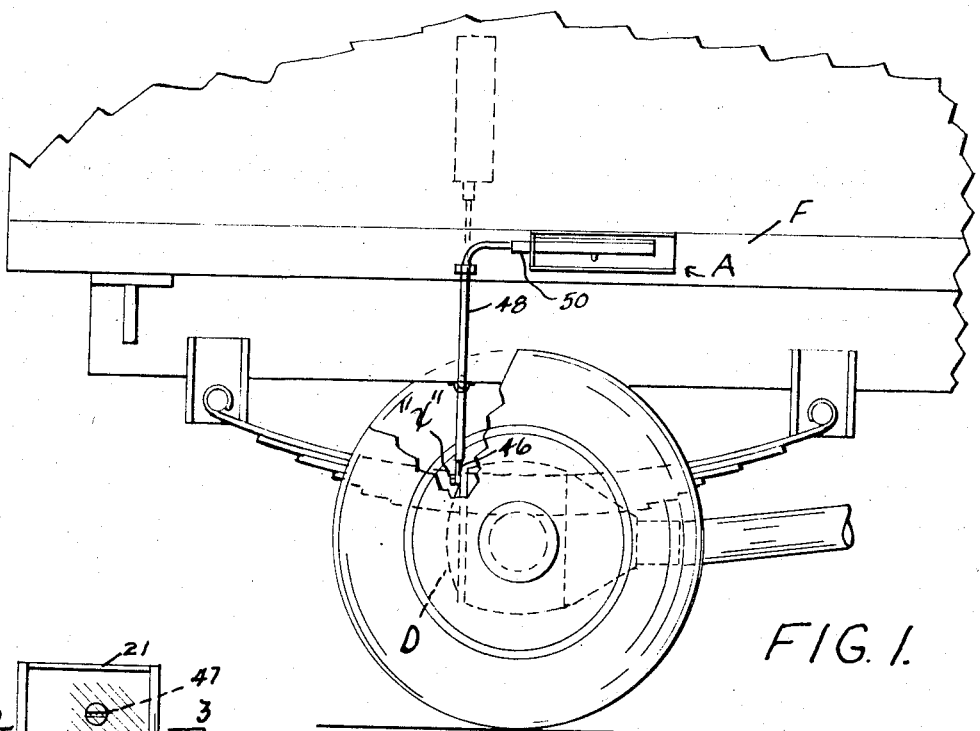
FIG. 1 is side elevational view of the rear end portion of a truck having the weight indicating device embodying the invention mounted thereon.

Referring to the drawings in detail, the truck weight indicating device A includes as a part of the housing H the flat back support and reference member 10 to which is connected the spaced side members 12 and 14. Each of the side members 12 and 14 is formed with a recess 16 at the outer free edge thereof and extending the length thereof. A transparent removable front wall 18 is provided which fits into the recesses 16 of the side walls 12 and 14 and the lower edge of which bottoms out on the bottom wall 20 secured to the lower ends of the side walls and back support. A top member 21 is provided which extends over the upper ends of the side members and which abuts the front wall. The bottom member provides a shoulder for the spring hereinafter referred to.

The numeral 22 designates a tube having a substantially rectangular cross section and which is formed of the side walls 24 and 26 connected to the front wall 28. The wall 26 has a flange 30 extending therefrom which is used to attach the tube to the back wall 10 by means of screws 32. The width of the wall 24 is less than the width of the wall 26 so that when the tube 22 is mounted on the back 10 the edge of the wall 24 is spaced from the back thereby forming the slot 34 between the edge of the wall 24 and the back 10. The back 10 forms a rear wall for the tube 22.

Further provided is the pointer member 36 formed of the solid body having a substantially rectangular transverse cross-section and rectangular longitudinal section. A hole 38 is formed longitudinally through the pointer body and two set screws 40 and 42 extend into the body communicating with the hole 38. The pointer member 36 is of such dimensions that it slides freely in the tubes 22 and the pointer has the pointer portion 44 extended therefrom which extends outwardly of the tube and freely through the slot 34 to indicate upon the back 10 as hereinafter set forth.

The numeral 46 designates a cable the upper end of which is secured within the hole 38 of the pointer 36 by means of the set screws 40 and 42. The cable 46 extends from the pointer member 36 downwardly through the tube 22, through a hole in the bottom 20 and out through the flexible tube 48 connected to the bottom 20 by means of the collar 50. Positioned between the lower end of the pointer member 36 and the bottom 20 and extending upon the cable 46 is the coil spring 52 which urges the pointer member 36 and the cable into an upward extended position. The tube 48 is secured to the frame of the truck and extends to a point adjacent the differential D where the lower end of the cable 46 is secured to the differential as at "x." The housing H is secured to the truck frame member F by means of the bolts 47 and 49.

It will be seen that the pointer member 36 remains at a constant position relative to the differential D, and as the body and frame of the truck move up and down the housing H and back support 10 thereof move up and down whereby the scale S on the back 10 is moved relative to the pointer portion 44. The back 10 is provided with the scale marks RL for road limit, AL for axle limit and EW for empty weight. When the truck is loaded to the scale mark RL that is the limit of load allowed on a particular road. When the truck is empty, the pointer 44 will be at EW. When the truck has a load so that the pointer is at AL it is the limit the truck can carry. As the truck is loaded the device tube and housing move down while the pointer remains stationary.

Figure 2:
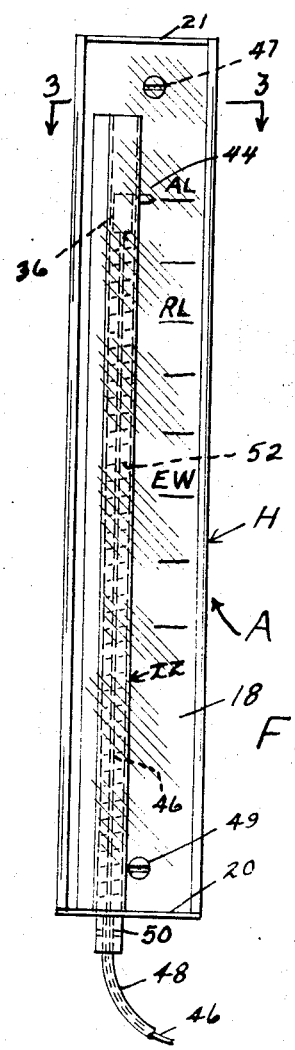
FIG. 2 is a front elevational view of the device.
Figure 3:
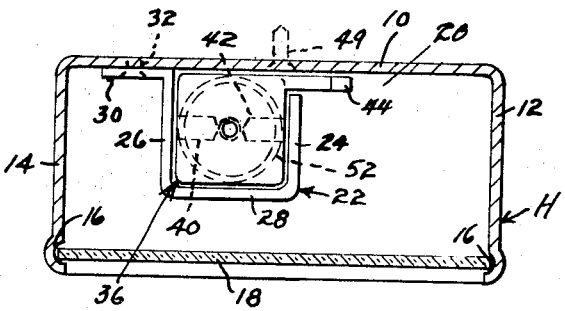
FIG. 3 is a sectional view on the line 3—3 of FIG. 2.
Figure 4:
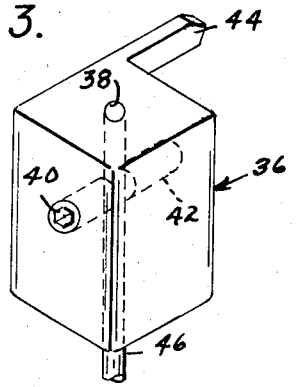
FIG. 4 is a perspective view of the pointer member removed from the device.

The devide is installed by raising the truck frame and body which drops the wheels clear of the ground. The lower end of the cable 46 is then fastened to the differential which is when the spring 52 is at full compression. The frame and body of the truck is then lowered to the ground which gives the empty weight position and the mark EW placed on the backboard 18 as in FIG. 2. The road limit is then determined, and the RL mark affixed. The axle limit of the truck is determined, and the mark AL affixed to back board 18.

The device may be mounted in a horizontal position or in a vertical attitude as illustrated in FIG. 1.

I claim:

1. A weight scale in combination with a vehicle having a frame spring-mounted on a chassis, comprising:
   a. a reference back member secured to said frame;
   b. a pointer member;
   c. means slidably mounting said pointer member upon said back member;
   d. means urging said pointer in an extended position relative to said mounting means;
   e. a cable connected at one end to said pointer and extending from said mounting means and connected at the other end to the chassis of the vehicle so that when a load is placed on the vehicle, said reference back member slidably moves relative to the pointer thereby indicating the weight of the vehicle load on the reference back member.

2. The device of claim 1 in which said means slidably mounting said pointer includes a tube in which said pointer is positioned.

3. The device of claim 1 in which
   a. said urging means is a coil spring positioned against said pointer and
   b. a shoulder on said back member.

4. The device of claim 1 in which said pointer member includes a body having a pointer extension.

5. The device of claim 4 in which said means slidably mounting said pointer includes a tube in which said pointer is positioned.

6. The device of claim 5 in which
   a. said urging means is a coil spring positioned against said pointer and
   b. a shoulder on said back member.

7. The device of claim 6 in which said tube includes a slot through which said pointer extension extends and overlies said back member.

* * * * *